Figure 1:
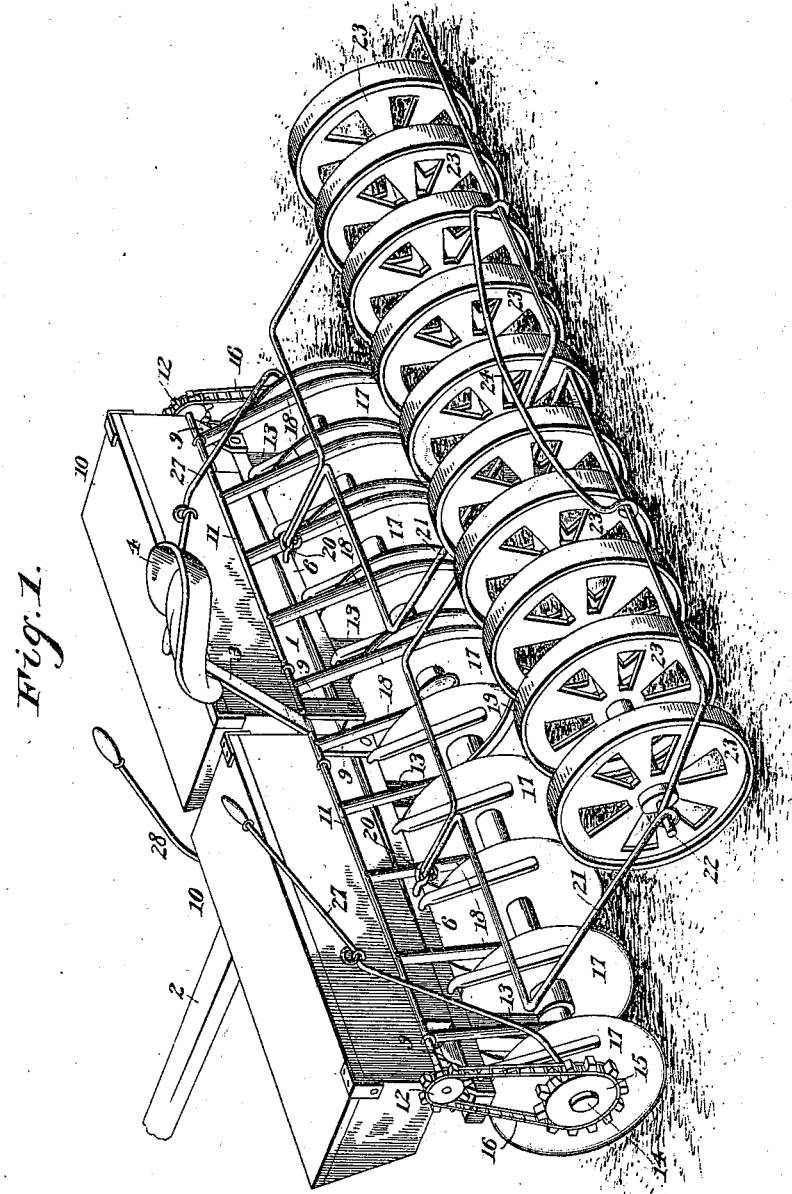

(No Model.) 2 Sheets—Sheet 2.
W. G. SAYR.
PLANTER.
No. 502,832. Patented Aug. 8, 1893.
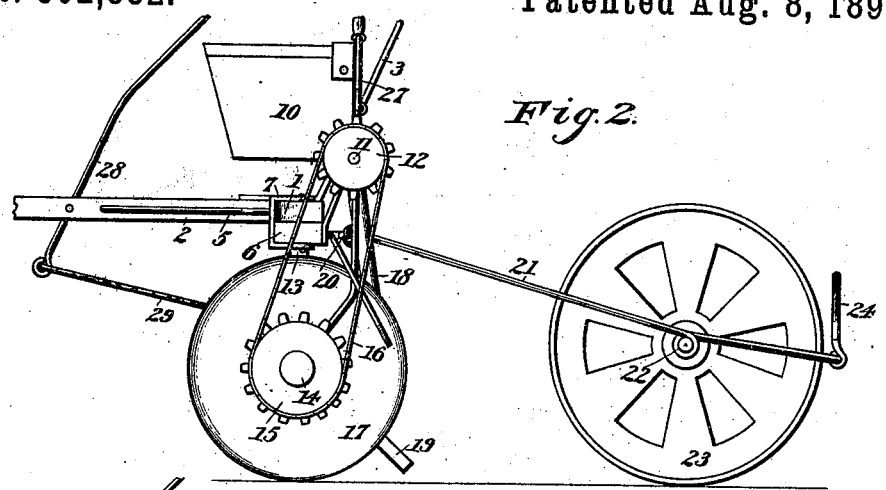
Fig. 2.
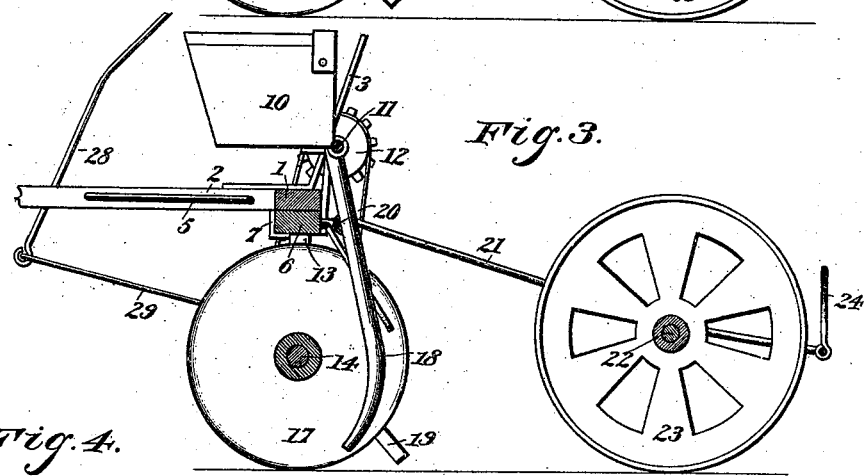
Fig. 3.
Fig. 4.
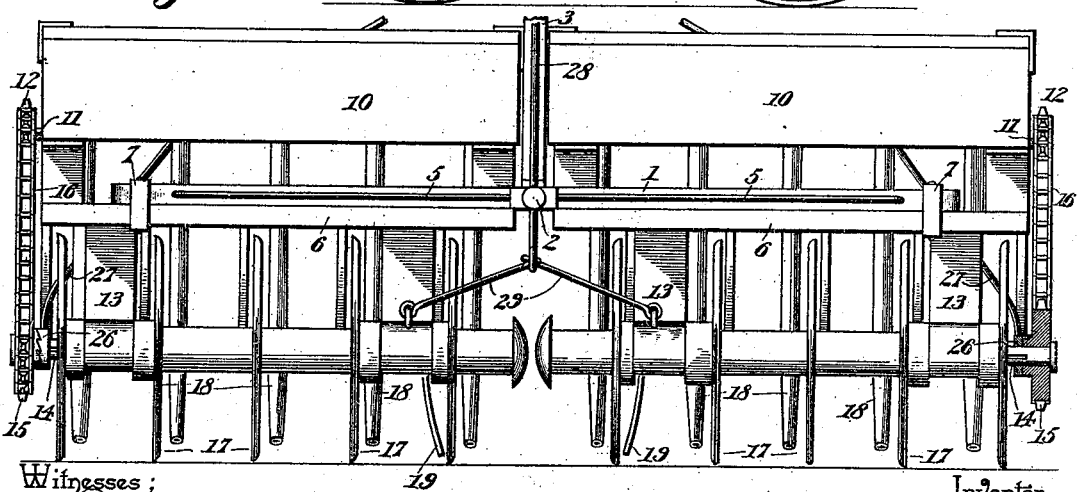
Witnesses;
Inventor,
Wm. G. Sayr,
By his Attorneys,

UNITED STATES PATENT OFFICE.

WILLIAM G. SAYR, OF LA HARPE, ILLINOIS.

PLANTER.

SPECIFICATION forming part of Letters Patent No. 502,832, dated August 8, 1893.

Application filed December 10, 1892. Serial No. 454,774. (No model.)

*To all whom it may concern:*

Be it known that I, WILLIAM G. SAYR, a citizen of the United States, residing at La Harpe, in the county of Hancock and State of Illinois, have invented a new and useful Planter, of which the following is a specification.

My invention relates to improvements in planters; and the objects in view are to provide a planter adapted to efficiently and continuously drill a series of rows, that is, form furrows, drop the grain, and cover said furrows all in one continuous, unbroken operation; furthermore, to so construct the machine as to adapt the same to be readily thrown into and out of position for planting, and thereby adapted for transportation or planting, as the case may be.

With these general objects in view the invention consists in certain features of construction hereinafter specified and particularly pointed out in the claim.

Referring to the drawings:—Figure 1 is a rear perspective of a planter embodying my invention. Fig. 2 is a side elevation thereof. Fig. 3 is a transverse sectional view through the hoppers and harrow-disks. Fig. 4 is a front elevation.

Like numerals of reference indicate like parts in all the figures of the drawings.

1 designates a transverse beam, to the center of which is secured a draft-tongue 2, and from the intersection of the beam and draft-tongue rises a seat-standard 3, which extends to the rear and supports an ordinary seat 4, for the accommodation of the driver. Hounds 5, are diagonally-disposed and serve to connect the transverse beam at its ends with the tongue or draft-pole in front of the beam.

Connected loosely with the opposite ends of the transverse beam, by means of clips or stirrups 7, is a pair of harrow-bar sections 6. By means of this connection the harrow-bars are capable of swinging in or out at their inner ends and thus being swung at an angle to the beam and to each other. Standards 9 rise from each of the harrow-bars, and each series of standards supports a hopper or seed-box 10. To the rear of each seed-box there is journaled a longitudinally-disposed agitator-shaft 11, each of whose outer ends beyond the box is provided with a sprocket-wheel 12. Pairs of standards 13 depend from each of the harrow-bars and terminate at their lower ends in bearings, and in each pair of standards below each of the harrow-bars there is located and journaled a shaft 14. Each of the shafts 14 extends beyond its bearings and has its outer end provided with a sprocket-wheel 15, which is connected to the sprocket-wheel 12 by means of a sprocket-chain 16. The inner ends of the shafts extend beyond the inner standards, and at said points and at intervals throughout the remainder of their lengths, the said shafts have located and secured thereon a series of concavo-convexed harrow-disks 17. It will be seen that motion will be conveyed from the shafts through the sprocket-wheels and chains to the agitator-shafts of the hoppers so that a feed will result. From the hoppers at points above the disks there depends a series of seed-tubes 18, whose lower ends terminate at the convexed sides of the disks adjacent to the ground, whereby the seed is dropped into the furrows formed by the disks. Located at the inner sides of the two central disks is a pair of covering-arms or blades 19 to cover the furrow formed by the two central disks, which would otherwise remain uncovered as they have no disks located adjacent to their convexed sides for accomplishing such operation. Eyes 20 extend from the rear and center of the bars 6, and in each eye are connected the front terminals of a rectangular bail or frame 21. These frames are of the same width as the series of harrow-disks, and are provided at their opposite sides with bearings for the accommodation of shafts 22. These shafts accommodate a series of packing-wheels 23, and the wheels lie in the rear of the disks and are designed to follow thereafter and in their paths, whereby they serve to pack the soil into the furrow subsequent to the dropping of the seed. A loose bowed connecting-bar 24, connects the rear ends of the two bails or frames so that they lie parallel to each other or in alignment, and do not become disposed at an angle to each other as do the disks of the harrow-sections. The sprocket-wheels 15 of the two disk-carrying shafts are loose upon the shafts and have their inner faces toothed. Splined upon these shafts at the inner sides of the sprocket-wheels is a pair of clutchsleeves 26, and the same are engaged and operated by a pair of levers 27 fulcrumed on the rear sides of the hoppers or seed-boxes, and terminating within easy reach of the driver when perched upon the seat 4. It will be seen that by shifting these levers the feed of the seed may be commenced or discontinued as desired. A lever 28 is fulcrumed in an opening formed in the tongue 2 and at its upper end is also within easy reach of the driver. The lower end of the lever which is below the draft-tongue or pole is connected by means of rods 29 with the inner standards that depend from the bars 8 or they may be connected with other portions of the harrow-sections, the objects in view being simply to produce by a manipulation of the said lever a swinging of the harrow sections, which sections include the seed-boxes or hoppers, the bars 8, the disks and their shafts, so that as will be apparent, and as stated as being one of the objects of my invention, I am enabled to conveniently manipulate the harrow-sections so as to bring them in alignment with relation to each other or swing their inner ends to the rear and dispose them at an angle with relation to each other. The former position they occupy when going to or from the field of operation, while the latter position is that occupied by them when in the act of planting.

It will be seen that in operation the harrow-disks being disposed at an angle to the line of draft, serve to form the furrows, and their shafts communicating motion through the sprocket-wheels and belts to the feed-shafts of the hoppers, seed will be carried by the seed-tubes to the bottoms of the furrows, which will be immediately covered by the adjacent disks and the turning blades before mentioned and followed by the packing-wheels, which wheels are broad-rimmed and serve to snugly press the loose soil down into the furrow and thus effectually cover the seed.

It will be seen that my machine is of exceedingly simple construction, containing a small number of parts and thus not complicated; that it possesses durability and is capable of efficiently operating for the purpose of accomplishing the objects in view, namely, the furrowing, planting, closing of the furrow, and packing of the seed therein all in one continuous operation.

Having described my invention, what I claim is—

In a planter, the combination with the transverse beam, the tongue extending therefrom, the lever fulcrumed on the tongue, of the harrow-bars loosely connected between their ends to the ends of the transverse beam, harrow-disks located below and supported by the bars, connections between the inner ends of the shafts of the disks and the lever, independent hoppers supported above the bars, seed-tubes leading from the hoppers to the disks, agitator shafts for the hoppers, means for communicating motion from the disk-shafts to the agitator-shafts, rectangular frames loosely pivoted at their centers to the centers of the harrow-bars, transverse shafts mounted in the frames, packing-wheels mounted on the shafts in rear of the disks, and a loose connecting-bar between the rear ends of the frames, substantially as specified.

In testimony that I claim the foregoing as my own I have hereto affixed my signature in the presence of two witnesses.

WILLIAM G. SAYR.

Witnesses:
  NOAH B. SAYR,
  OSCAR SAYR.